United States Patent
Sun (10) Patent No.: US 9,572,305 B2
(45) Date of Patent: Feb. 21, 2017

(54) PHOSPHOR DIFFUSION SHEET LUMINAIRE FOR AGRICULTURAL LIGHTING

(71) Applicant: National Central University, Taoyuan County (TW)

(72) Inventor: Ching-Cherng Sun, Taoyuan County (TW)

(73) Assignee: NATIONAL CENTRAL UNIVERSITY, Zhongli, Taoyuan County (TW)

( * ) Notice: Subject to any disclaimer, the term of this patent is extended or adjusted under 35 U.S.C. 154(b) by 317 days.

(21) Appl. No.: 14/300,432

(22) Filed: Jun. 10, 2014

(65) Prior Publication Data
US 2015/0354760 A1   Dec. 10, 2015

(51) Int. Cl.
| F21V 9/16 | (2006.01) |
| A01G 7/04 | (2006.01) |
| F21V 3/04 | (2006.01) |
| F21Y 101/00 | (2016.01) |

(52) U.S. Cl.
CPC .............. *A01G 7/045* (2013.01); *F21V 3/0463* (2013.01); *F21V 9/16* (2013.01); *F21V 3/049* (2013.01); *F21Y 2101/00* (2013.01); *F21Y 2105/10* (2016.08); *F21Y 2115/10* (2016.08)

(58) Field of Classification Search
CPC ........ A01G 7/045; F21V 3/0463; F21V 3/049; F21V 9/16; F21Y 2101/02; F21Y 2105/001
USPC .................. 362/253, 601, 232, 230, 231, 84
See application file for complete search history.

(56) References Cited

U.S. PATENT DOCUMENTS

| 8,047,676 B2* | 11/2011 | Cheng .................... F21V 5/002 362/240 |
| 8,292,466 B2* | 10/2012 | Huang ...................... F21V 5/04 362/308 |
| 9,279,560 B2* | 3/2016 | Jiang ......................... F21V 5/04 |
| 2007/0047228 A1* | 3/2007 | Thompson ........... G02B 6/0018 362/237 |
| 2007/0047261 A1* | 3/2007 | Thompson ........... G02B 6/0028 362/623 |
| 2009/0129097 A1* | 5/2009 | Ewert ................. B29C 45/0025 362/328 |
| 2010/0085763 A1* | 4/2010 | Aguglia .................... F21V 5/04 362/311.06 |
| 2011/0183368 A1* | 7/2011 | Chapman ............... A01G 7/045 435/29 |
| 2012/0074833 A1* | 3/2012 | Yuan ..................... H05B 33/14 313/483 |

(Continued)

*Primary Examiner* — Robert May
*Assistant Examiner* — Tsion Tumebo
(74) *Attorney, Agent, or Firm* — Guice Patents PLLC (57) ABSTRACT

The invention relates to a phosphor diffusion sheet luminaire for agricultural lighting, comprising: a lamp shell; a light source unit; a disc body, mounted in the accommodating space and gripped on the inner wall of the lamp shell, where the disc body is provided with plural tanks at the side corresponding to the light source unit, and the tanks are randomly filled with plural phosphors; and a diffusion sheet, mounted in the lamp shell, and the side of the diffusion sheet corresponding to the disc body. The light ray passing through the diffusion sheet will irradiate the plant. And the wavelength of the light ray varies according to different ratio of the phosphors. Adequate wavelengths are gained by means of light transmission, refraction and absorption, which is beneficial to control the growth of plant.

5 Claims, 6 Drawing Sheets

(56) References Cited

U.S. PATENT DOCUMENTS

2012/0161170 A1\* 6/2012 Dubuc .................. A01G 7/045
 257/89
2012/0300452 A1\* 11/2012 Harbers ................... F21V 9/16
 362/231

\* cited by examiner

PHOSPHOR DIFFUSION SHEET LUMINAIRE FOR AGRICULTURAL LIGHTING

BACKGROUND OF THE INVENTION

1. Field of the Invention

The present invention relates to a phosphor diffusion sheet luminaire for agricultural lighting, and especially relates to applications for agriculture related fields, where the main feature is to provide illumination for the plant, and the provision and replacement of the phosphor diffusion sheet is used to control the wavelength of plant growth, an invention of practicality.

2. Description of Related Art

A prior plant lighting on the market is referenced herein, which includes at least one light emitting diode (LED) modules, where the LED module is provided with at least one blue LED device, or at least one red and one blue LED device, and the light emitted surface of each LED device is furnished with red phosphors, where the red phosphors blend with the light source of the LED device, to produce artificial lighting that favors plant growth. The output light power of the LED can be regulated through the controller, to achieve the control of the growth rate of plant.

The aforementioned technique takes advantage of the light illumination of the LED to expedite plant growth, and achieves the purpose of accelerating the plant growth, but this LED employs the red and blue light as its light source, and through various combinations to engage in light mixing modulation, where lighting wavelength needed for plant growth can be modulated. But the light attenuation for the red and blue light is not the same, and the regular LED contains not only red and blue light but it could contain green light. On the other hand, a LED lamp mixed by three light colors features different wavelengths and inconsistent attenuation. Since different wavelength demands dissimilar current, the control of current is difficult and further leads to issues of cost and power consumption; therefore, relevant industry may further thought how to improve to conform to the use by public.

In view of the foregoing circumstances, the inventor has invested a lot of time to study the relevant knowledge, compare the pros and cons, research and develop related products. After quite many experiments and tests, the "phosphor diffusion sheet luminaire for agricultural lighting" of this invention is eventually launched to improve the foregoing shortcomings, to meet the public use.

SUMMARY OF THE INVENTION

The main object of the present invention is to provide a variety of different wavelengths for various types of plant. By means of a variety of phosphors for filling, the light irradiates various phosphors followed by a mixing so that the light irradiated through the phosphors has wavelengths conforming to plant growth. Besides, different type of plant calls for different carrier to hold the phosphors which fully conforms to the wavelengths demanded by the plant. As regards the prior art technologies, the light mixing for the red, green, and blue light of the LED cannot be blended with more accurate way, and the mixing of various light colors also cannot be easily controlled, resulting in drawbacks of increase in cost and lack of electricity.

Accordingly, the inventor has endeavored to achieve the foregoing purpose and feature. The present invention relates to a phosphor diffusion sheet luminaire for agricultural lighting, comprising: a lamp shell, having an accommodating space, and an assembly entrance at its one side that connects to the accommodating space; a light source unit, located in the accommodating space and disposed on the inner side surface of the lamp shell corresponding to the assembly entrance; a disc body, mounted in the accommodating space and gripped on the inner wall of the lamp shell, where the disc body is provided with plural tanks at the side corresponding to the light source unit, the tanks are disposed in a spaced array, and part of the tanks are filled with plural phosphors, in which the ratio of the phosphors at each tank is not the same; and a diffusion sheet, mounted near the assembly entrance of the lamp shell and further to block the assembly entrance, and the side of the diffusion sheet corresponding to the disc body is provided with plural arc recess bars in line, and each of the arc recess bars is formed by plural arc notches joined side by side, and the parallel direction of the arc notch and the parallel direction of the arc recess bar is perpendicular to each other. Among them, the light from the light source illuminates the disc body and irradiates each phosphor and the tanks without the phosphors inside, followed by irradiating to the diffusion sheet. The light passing through the diffusion sheet will irradiate the plant. And the light wavelength varies according to different ratio of the phosphors. With the setup of each arc notch of each arc recess bar at the diffusion sheet with further light mixing, light of various wavelengths comes out adequate wavelengths by means of light transmission, refraction and absorption, which is beneficial to control the growth of plant.

A further technical feature of the present invention lies in that the light source unit comprises plural short-wavelength LEDs or short wavelength LED chips.

A further technical feature of the present invention lies in that the disc body is further made out of acrylic, glass or anti-UV transparent substance.

A further technical feature of the present invention lies in that each tank of the disc body is rectangular or semi-spherical in shape.

A further technical feature of the present invention lies in that the each phosphor is characterized as red, green, yellow or blue, where each phosphor in the tank differentiates in ratio, concentration, thickness and category.

A further technical feature of the present invention lies in that the diffusion sheet is further an optical brightened sheet.

A further technical feature of the present invention lies in that the arc curvature of each arc notch of each arc recess bar on the diffusion sheet features parabolic pattern distribution, and the opening of each arc notch is ten times wider than the visible light wavelength while smaller than the area radiated by the light source unit.

The various objectives and advantages of the present invention will be more readily understood from the following detailed description when read in conjunction with the appended drawing.

DETAILED DESCRIPTION OF THE INVENTION

Figure 1:
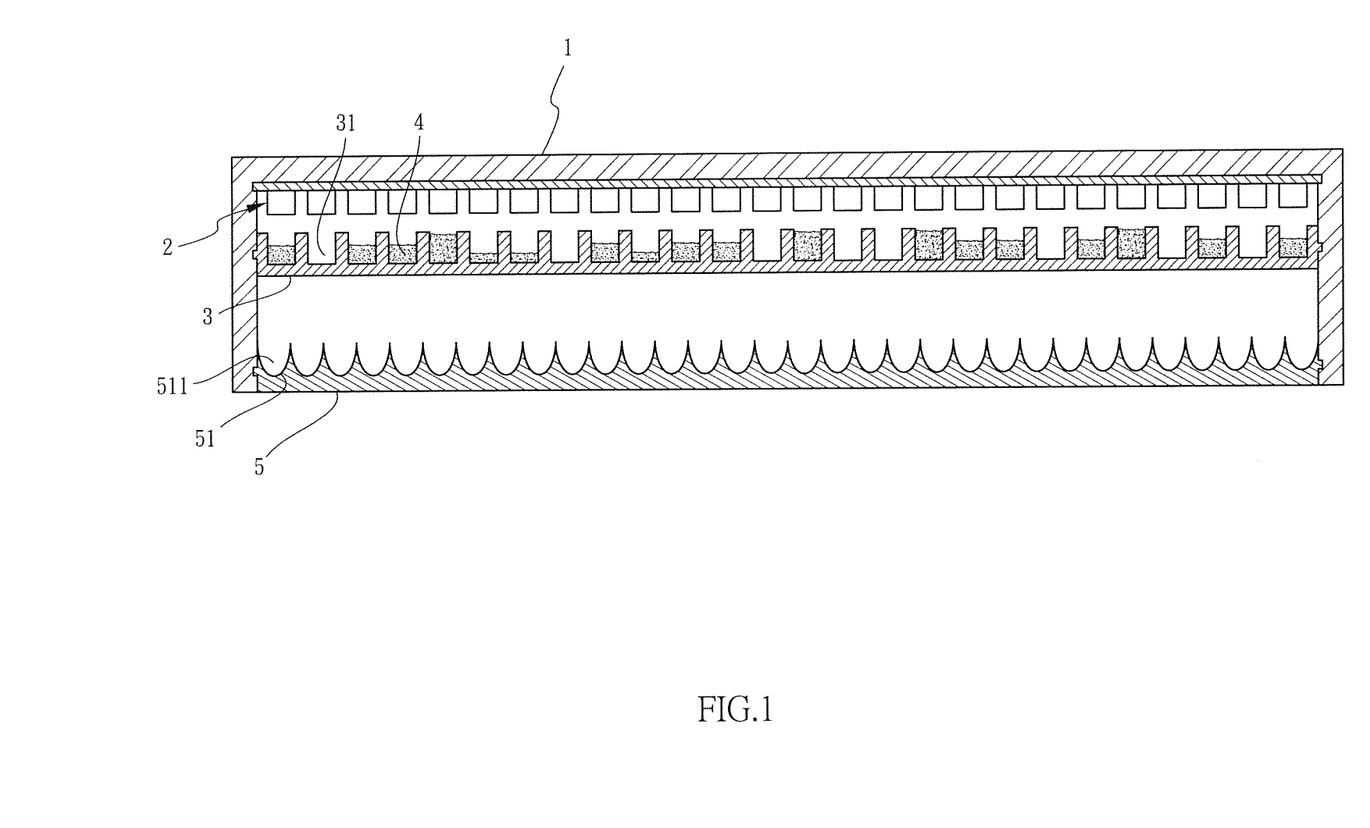
FIG. 1 is a sectional diagram of a preferred embodiment of the present invention.
Figure 2:
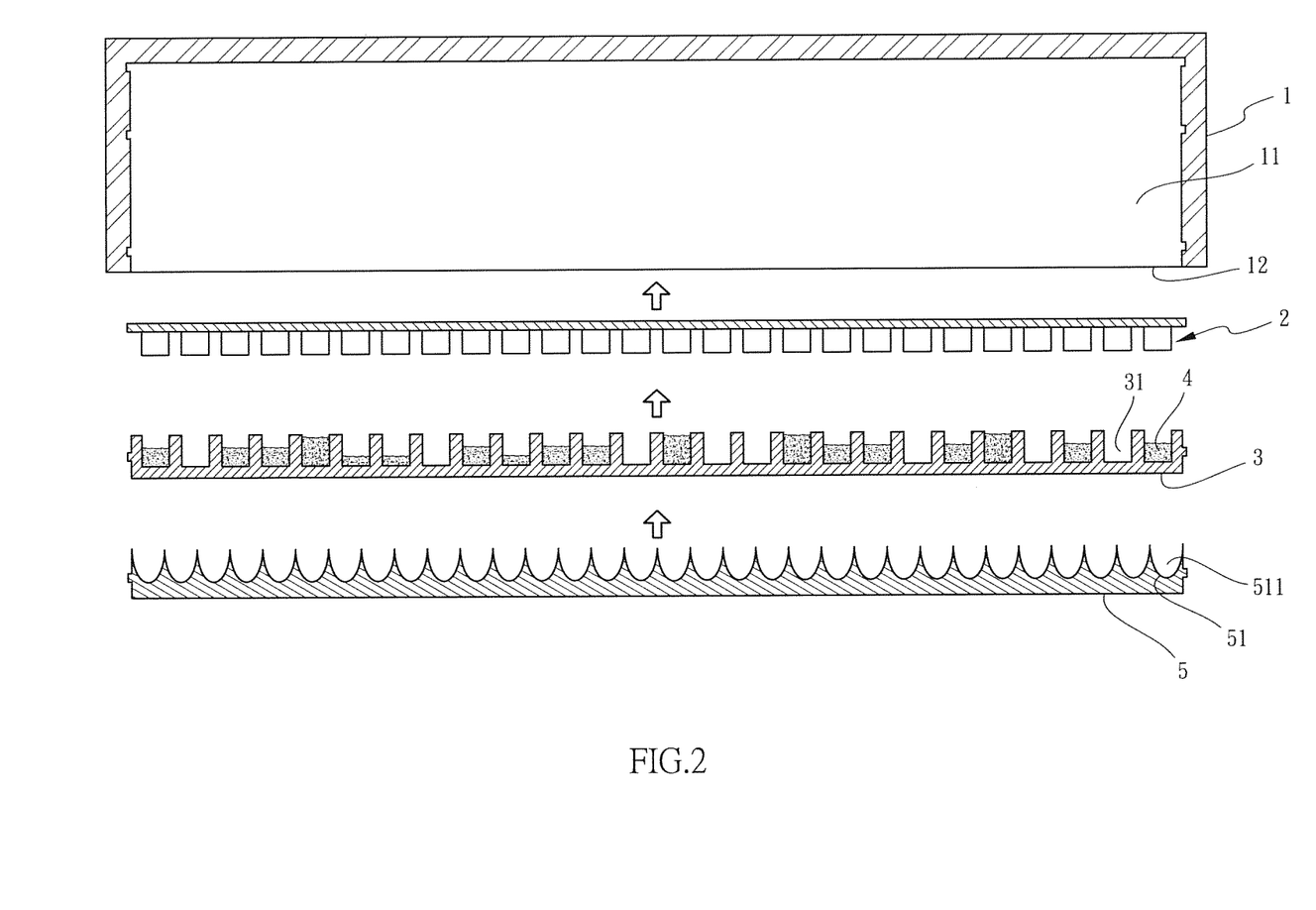
FIG. 2 is an exploded sectional diagram of a preferred embodiment of the present invention.

To describe clearly that the present invention achieves the foregoing objective and function, the technical features and desired function are described with reference to a preferred embodiment and accompanying drawings. Reference to FIGS. 1-4, the present invention relates to a phosphor diffusion sheet luminaire for agricultural lighting, comprising: a lamp shell 1, where its embodiment in FIG. 1 is in the shape of rectangular body, having an accommodating space 11, and an assembly entrance 12 at its one side that connects to the accommodating space 11; a light source unit 2, located in the accommodating space 11 and disposed on the inner side surface of the lamp shell 1 corresponding to the assembly entrance 12, where the ray of the light source unit 2 irradiates towards the assembly entrance 12; a disc body 3, similar in shape with the lamp shell 1, mounted in the accommodating space 11 of the lamp shell 1 and gripped on the inner wall of the lamp shell 1, where the disc body 3, disposed with a distance relative to the light source unit 2, is provided with plural tanks 31 at the side corresponding to the light source unit 2, the tanks 31 are disposed in a spaced array, and part of the tanks 31 are filled with plural phosphors 4, in which the ratio of the phosphors 4 at each tank 31 is not the same; and a diffusion sheet 5, mounted near the assembly entrance 12 of the lamp shell 1 and further to block the assembly entrance 12, and the side of the diffusion sheet 5 corresponding to the disc body 3 is provided with plural arc recess bars 51 in line, and each of the arc recess bars 51 is formed by plural arc notches 511 joined side by side, and the parallel direction of the arc notch 511 and the parallel direction of the arc recess bar 51 is perpendicular to each other. Among them, the light from the light source unit 2 irradiates the disc body 3 and irradiates each phosphor 4 and the tanks 31 without the phosphors 4 inside, followed by irradiating to the diffusion sheet 5. The light passing through the diffusion sheet 5 will irradiate the plant. And the wavelength of light varies according to different ratio of the phosphors 4. With the setup of each arc notch 511 of each arc recess bar 51 at the diffusion sheet 5 with further light mixing, light of various wavelengths comes out adequate wavelengths by means of light transmission, refraction and absorption, which is beneficial to control the growth of plant.

Figure 3:
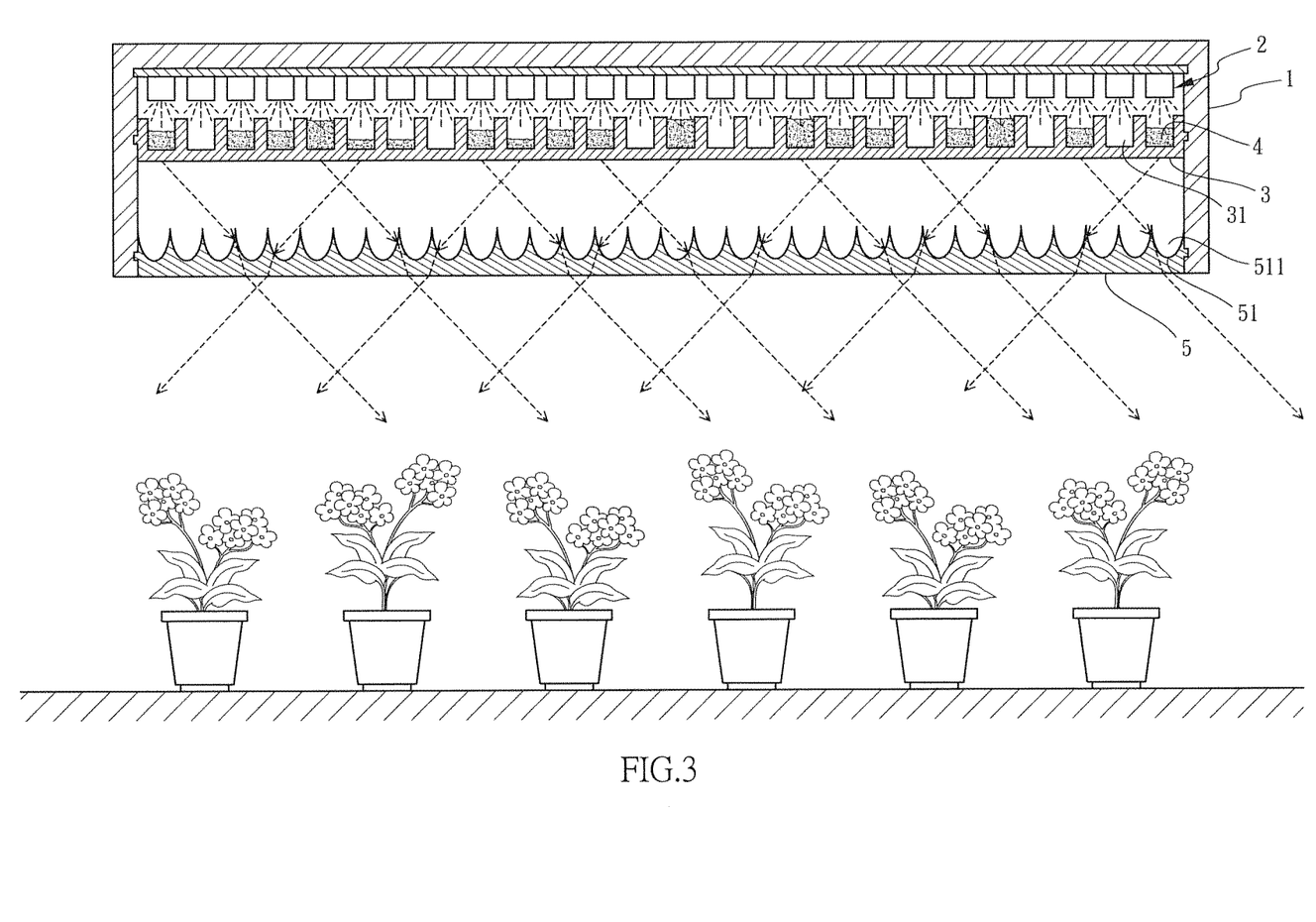
FIG. 3 is a schematic diagram of the ray radiation path of a preferred embodiment of the present invention.
Figure 4:
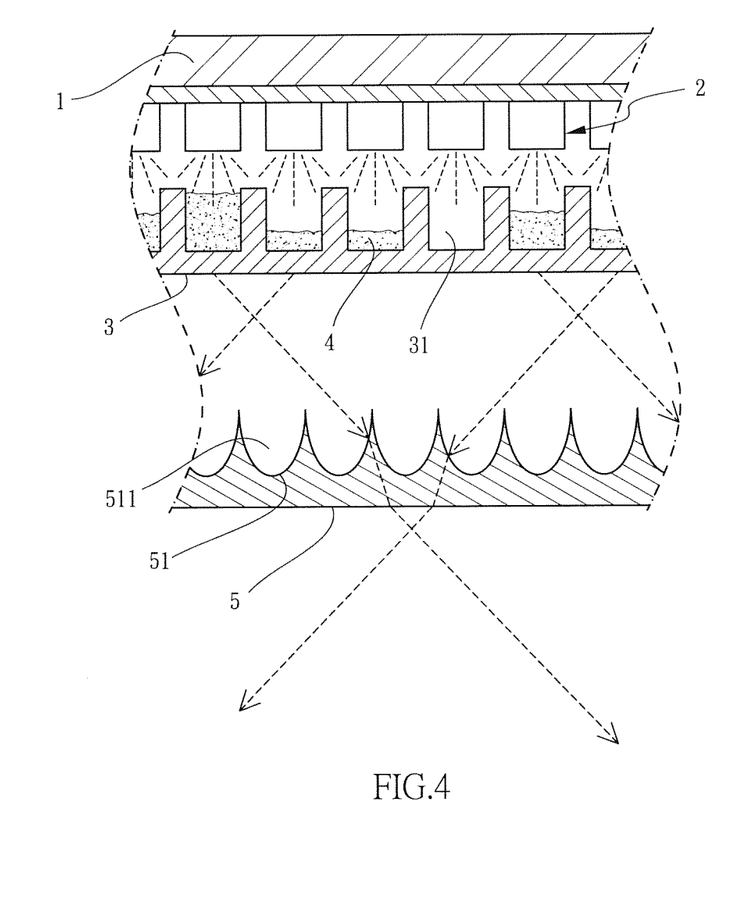
FIG. 4 is an enlarged schematic diagram of a portion of FIG. 3 of a preferred embodiment of the present invention.

With reference to FIGS. 3-4, the light ray from the light source 2 illuminates the disc body 3 first, where the light ray enters the opening of each tank 31 of the disc body 3, and the phosphors 4 filled in each tank 31 have distinct ratio, thickness, concentration and category. And some tanks 31 aren't filled with phosphors inside. Once the light ray irradiates the disc body 3 and then each tank 31, according to phosphor 4 categories in the tanks 4 or tanks 4 without phosphor 4 inside, the light ray either irradiates the phosphors or passes through the tanks 4. The design of light ray that passes through the disc body 3 gives rise to an array of multiple light sources. Once the light ray passes through the phosphors 4 in the disk body 3, where its wavelength is changed and the light ray then irradiated the diffusion sheet 5, part of the light ray will penetrate the diffusion sheet 5 while others will be reflected and the rest will be absorbed by the diffusion sheet 5, through the design of each arc notch 511 of each arc recess bar 51 of the diffusion sheet 5, light ray can be effectively focused, which limits uniformly the irradiation on the region of crops, to achieve optimization of energy and effective growth of crops.

Figure 5:
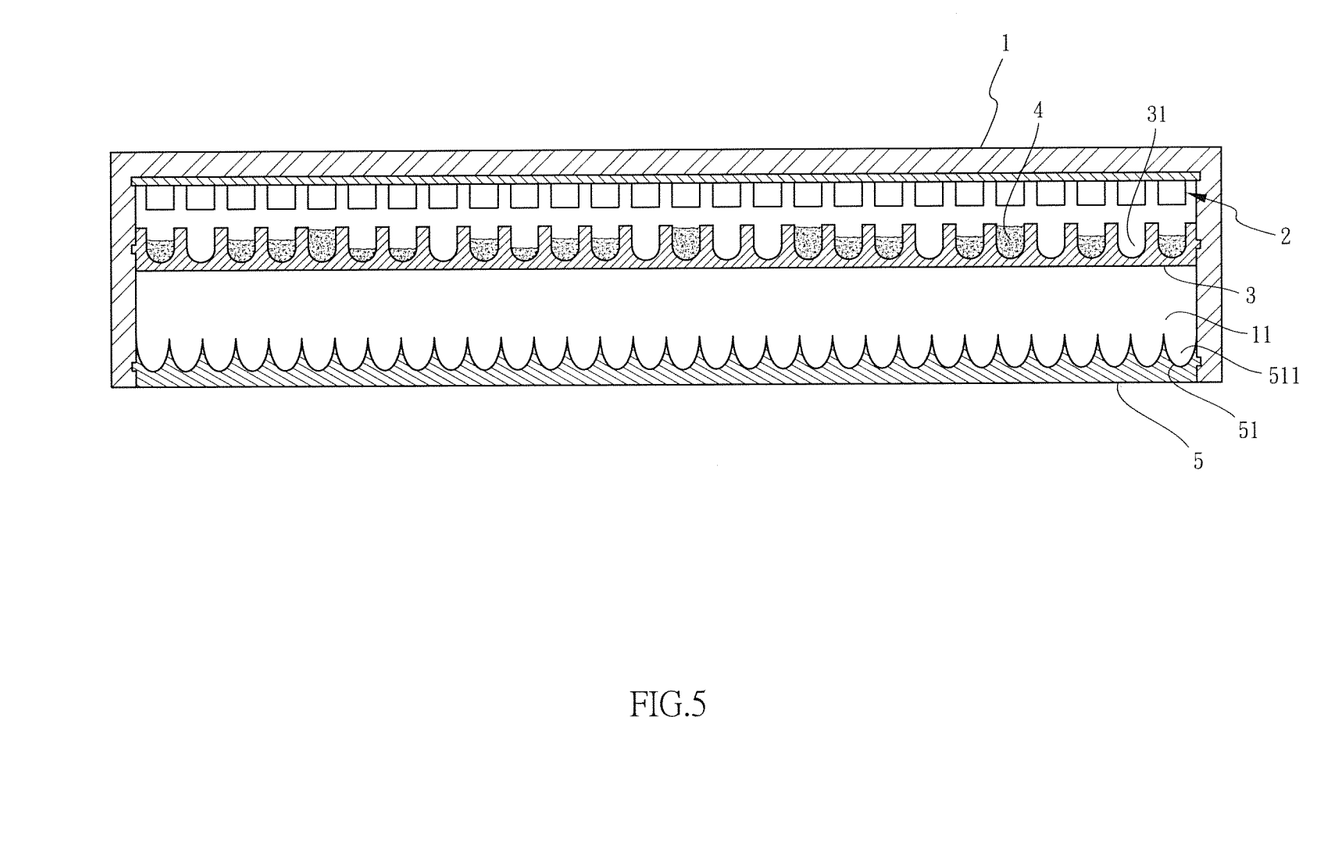
FIG. 5 is a sectional diagram of the disc body of a preferred embodiment of the present invention.
Figure 6:
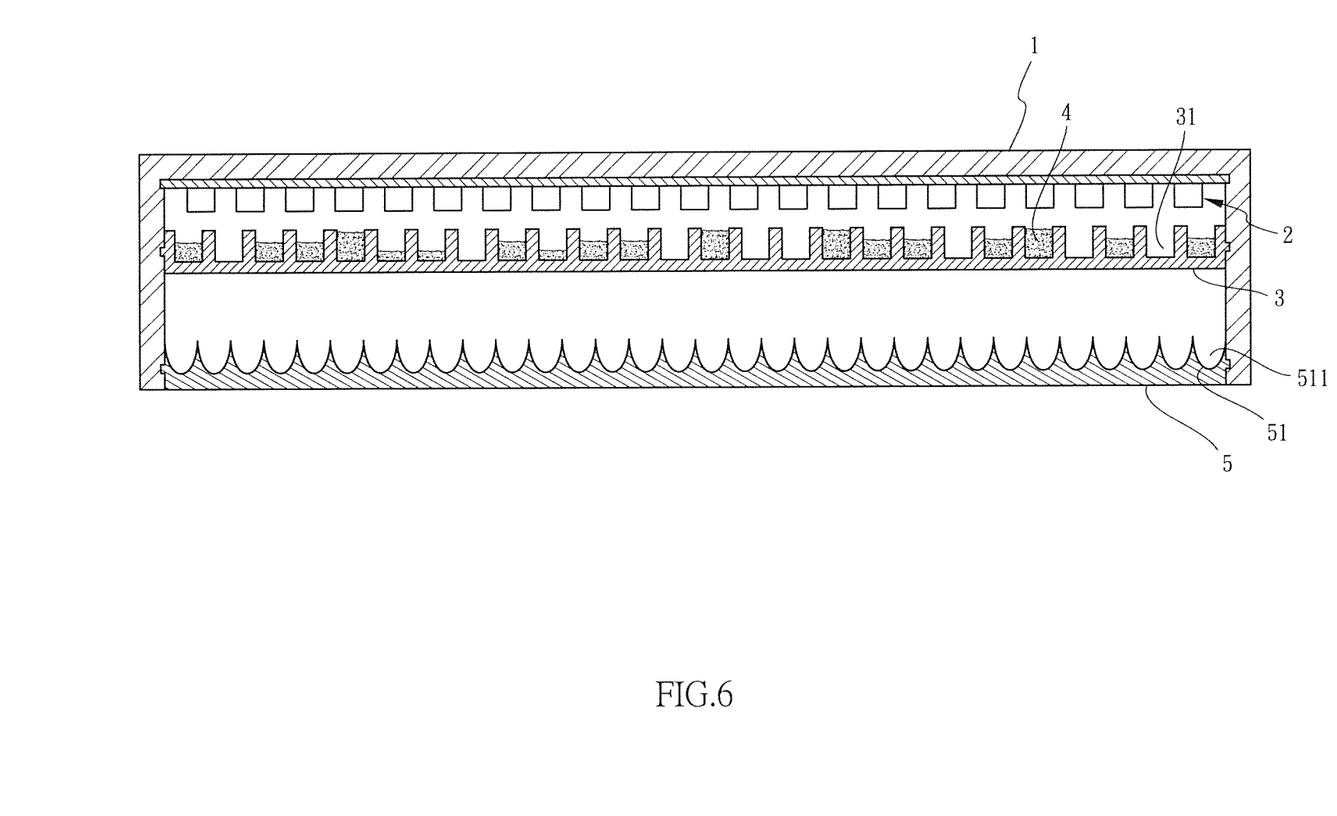
FIG. 6 is a schematic diagram of the cross type of the tanks of the disc body and the light source unit of a preferred embodiment of the present invention.

According to the above description, the design of the light source unit 2 of the present invention is based on plural short-wavelength LEDs or plural short-wavelength LED chips and the assembly of the plural LEDs form an array corresponding to each tank 31 of the disc body 3. FIG. 1 shows an embodiment of a single LED lamp corresponding to a single tank 31. It could be the design of a single LED lamp corresponding to multiple tanks 31, where the LED array and an array formed by the tanks 31 of disc body 3 are crossed one with the other, shown in FIG. 6, and the number of the LED lamps can be adjusted according to the area of the crops. The short-wavelength LED includes blue or ultraviolet LED, which is the primary technology of the present invention. The material for the disc body 3 is acrylic, glass or anti-UV transparent, which is not used to limit the category of the disk body 3. The kind of materials can be simply transparent, while anti-UV is to avoid the disc body from becoming yellowing which effects the light irradiation. The type of the light source unit 2 and the disc body 3 varies according to the type of the desired wavelength for the crops. And each tank of the disk body 3 is rectangular or semi-spherical in shape, shown in FIG. 5, subject to the crops. The phosphors 4 in the disc body 3 can be characterized as red, green, yellow or blue. In summary, the type, ratio, density and thickness of the phosphors, the shape of the tanks 31 of the disc body 3, and the type of illumination device of the light source unit 2, vary according to the kind of crops, thereby obtaining the absorption wavelength spectrum demanded by the growth of crops.

In the design of the diffusion sheet 5, each arc notch 511 of each arc recess bar 51 is arranged in a special lens array, where the depth, width and shape of each arc notch 511 can be adjusted according to the type of crops, or the type of the diffusion sheet 5 can be replaced, thereby the fulfillment of the requirements of different lighting design can be achieved. The effective concentration, limitation and uniform irradiation on the area of crops reduce the loss of energy; reduce the impact of glare; and the suppression of the light pollution. The arc curvature of each arc notch 511 features parabolic pattern distribution and the opening of each arc notch 511 is ten times wider than the visible light wavelength while narrower than the area radiated by the light source unit 2. Once light ray passes through the side of the diffusion sheet 5 disposed with plural arc recess bars 5, the light ray will be refracted to change its path. The change of the shape for the arc notch 511 by different crops is targeted to increase the light ray emitting angles for a wider coverage of irradiation. The material of the diffusion sheet 5 features high penetration, low absorption and low reflectance, shown in FIGS. 3-4. The design of the diffusion sheet 5 of this invention adopts brightness enhancement film (BEF) or dual brightness enhancement film (DBEF), where the films each is a prism array structure, which help to boost the illumination.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A phosphor diffusion sheet luminaire for agricultural lighting, comprising:

a lamp shell, having an accommodating space therein, and an assembly entrance at a side thereof that communicates with the accommodating space;

a light source unit, located in the accommodating space and disposed on an inner side wall of said lamp shell corresponding to the assembly entrance;

a disc body, mounted in the accommodating space and gripped on an inner wall of said lamp shell, where said disc body is provided with a plurality of tanks at a side corresponding to said light source unit, the tanks being disposed in a spaced array, and a fraction of the tanks being filled with a plurality of the phosphors, in which a ratio of the phosphors at each tank is not the same; and a diffusion sheet, mounted near the assembly entrance of said lamp shell and further to block the assembly entrance, and a side of said diffusion sheet corresponding to said disc body being provided with a plurality of arc recess bars in line, and each of the arc recess bars being formed by a plurality of arc notches joined side by side, and a parallel direction of the arc notch and a parallel direction of the arc recess bar being perpendicular to each other, said diffusion sheet is further an optical brightened sheet;

wherein, a ray of light from said light source unit illuminating said disc body and irradiating respective phosphors and the tanks without the phosphors therein, followed by irradiating to said diffusion sheet, the ray passing through said diffusion sheet irradiating plants, and a wavelength of the ray varying according to a different ratio of the phosphors through which the ray passes, with a setup of the arc notch of the arc recess bar at said diffusion sheet, the ray of various wavelengths coming out in adequate wavelengths by means of light transmission, refraction and absorption, which is beneficial to control a growth of plants; and wherein an arc curvature of the arc notch of the arc recess bar on said diffusion sheet features parabolic pattern distribution, and an opening of each arc notch being ten times wider than a visible light wavelength yet narrower than an area radiated by said light source unit.

2. The phosphor diffusion sheet luminaire for agricultural lighting as claimed in claim 1 wherein said light source unit comprises a plurality of short-wavelength LEDs or short wavelength LED chips.

3. The phosphor diffusion sheet luminaire for agricultural lighting as claimed in claim 1 wherein said disc body is further made out of acrylic, glass or anti-UV transparent substance.

4. The phosphor diffusion sheet luminaire for agricultural lighting as claimed in claim 3, wherein each tank of said disc body is rectangular or semi-spherical in shape.

5. The phosphor diffusion sheet luminaire for agricultural lighting as claimed in claim 1, wherein each phosphor is characterized as red, green, yellow or blue, and each phosphor in the tank differentiating in ratio, concentration, thickness and category.

* * * * *